(12) United States Patent
Kandil et al.

(10) Patent No.: US 9,308,491 B2
(45) Date of Patent: Apr. 12, 2016

(54) MEMBRANE CONTACTOR FOR DEHUMIDIFICATION SYSTEMS

(71) Applicant: Carrier Corporation, Farmington, CT (US)

(72) Inventors: Sherif Kandil, Ellington, CT (US); Kenneth David Smith, East Longmeadow, CT (US); Zidu Ma, Ellington, CT (US); Rajiv Ranjan, Vernon, CT (US); Frederick J. Cogswell, Glastonbury, CT (US); Zissis A. Dardas, Worcester, MA (US); Bart A. Van Hassel, Weatogue, CT (US)

(73) Assignee: CARRIER CORPORATION, Farmington, CT (US)

( * ) Notice: Subject to any disclaimer, the term of this patent is extended or adjusted under 35 U.S.C. 154(b) by 170 days.

(21) Appl. No.: 14/155,611

(22) Filed: Jan. 15, 2014

(65) Prior Publication Data

US 2014/0264967 A1    Sep. 18, 2014

Related U.S. Application Data

(60) Provisional application No. 61/793,790, filed on Mar. 15, 2013.

(51) Int. Cl.
*B01D 53/22* (2006.01)
*B01D 53/26* (2006.01)
*F24F 3/14* (2006.01)

(52) U.S. Cl.
CPC ............ *B01D 53/263* (2013.01); *B01D 53/227* (2013.01); *B01D 53/229* (2013.01); *B01D 53/268* (2013.01); *B01D 2053/223* (2013.01); *F24F 2003/1435* (2013.01)

(58) Field of Classification Search
CPC .... B01F 3/04; B01D 53/22; B01D 2053/221; B01D 2052/223; B01D 2053/222; B01D 53/227; B01D 53/229; B01D 53/26; B01D 53/263
USPC ...................................... 96/4, 7, 10
See application file for complete search history.

(56) References Cited

U.S. PATENT DOCUMENTS

| 4,900,448 A | 2/1990 | Bonne et al. |
| 5,460,004 A | 10/1995 | Tsimerman |
| 5,558,087 A | 9/1996 | Psaros et al. |

(Continued)

FOREIGN PATENT DOCUMENTS

| CN | 102165268 | 8/2011 |
| DE | 10323113 A1 | 12/2004 |

(Continued)

OTHER PUBLICATIONS

European Search report for EP application 14151278.0, mailed Jun. 25, 2014, 8 pages.

(Continued)

*Primary Examiner* — Robert A Hopkins
(74) *Attorney, Agent, or Firm* — Cantor Colburn LLP (57) ABSTRACT

A contactor configured for use in a dehumidification system is provided including a plurality of contact modules. Each contact module has a porous sidewall that defines an internal space through which a hygroscopic material flows. Adjacent contact modules are fluidly coupled to form a multipass flow path for the hygroscopic material through the contactor.

16 Claims, 6 Drawing Sheets

(56) References Cited

U.S. PATENT DOCUMENTS

| | | |
|---|---|---|
| 5,653,115 A | 8/1997 | Brickley et al. |
| 6,497,107 B2 | 12/2002 | Maisotsenko et al. |
| 7,435,284 B2 | 10/2008 | Piccinini et al. |
| 7,758,671 B2 | 7/2010 | Kesten et al. |
| 8,268,060 B2 | 9/2012 | Hargis et al. |
| 2006/0112826 A1 | 6/2006 | Ichigaya |
| 2007/0144727 A1 | 6/2007 | Hirayama et al. |
| 2010/0319370 A1 | 12/2010 | Kozubal et al. |
| 2013/0298590 A1 | 11/2013 | Heinzl |

FOREIGN PATENT DOCUMENTS

| | | |
|---|---|---|
| DE | 102008019829 | 10/2009 |
| DE | 102010050042 A1 | 5/2012 |
| EP | 0013081 | 9/1980 |
| JP | 02110237 A * | 4/1990 |
| WO | 0179771 | 10/2001 |
| WO | 0244624 A1 | 6/2002 |
| WO | 2005033590 A1 | 4/2005 |
| WO | 2009054234 A1 | 4/2009 |
| WO | 2011150081 A2 | 12/2011 |
| WO | 2011161547 | 12/2011 |

OTHER PUBLICATIONS

European Office Action for Application No. 14 151 278.0 dated Aug. 27, 2015; 5 pages.

* cited by examiner

MEMBRANE CONTACTOR FOR DEHUMIDIFICATION SYSTEMS

CROSS-REFERENCE TO RELATED APPLICATIONS

This application claims the benefit of U.S. provisional patent application Ser. No. 61/793,790 filed Mar. 15, 2013, the entire contents of which are incorporated herein by reference.

BACKGROUND OF THE INVENTION

This invention was made with Government support under Contract No. DE-AR0000147. The Government has certain rights in the invention.

BACKGROUND OF THE INVENTION

The invention relates generally to contactors, and more particularly, to porous membrane contactors configured for use in a dehumidification system.

Membrane contactors allow a gaseous phase and a liquid phase, to exchange mass and heat between the phases, without dispersing one phase into the other. A common use for a membrane contactor is the removal or dissolution of gases in a liquid. Examples of conventional contactors include packed towers, flat panel membrane contactors, and tubular contactors. In conventional systems, membrane contactors are operated with an aqueous fluid flow adjacent one side of the hydrophobic membrane, and a gas applied to the other side of the membrane. Because the membrane is hydrophobic, the membrane will not allow liquid water to pass through the pores into the gas side of the membrane. By adjusting the vapor pressure of the gas in contact with the membrane, gases, such as water vapor for example, can be selectively removed or dissolved into the liquid.

The effectiveness of the dehumidification system is dependent on the efficiency of the membrane contactor. Conventional contactors have several deficiencies. For example, condensation may form on the gas side of the membrane. To improve porous membrane contactors performance in dehumidification applications, several enhancments of the membrane contactor are required. Exemplary enhancements include reducing the required membrane surface area by optimizing the mass and heat transfer driving potential distribution throughout the contactor and reducing the amount of condensate collected on the membrane, which may hinder the mass and heat transfer performance of the contactor.

BRIEF DESCRIPTION OF THE INVENTION

According to one embodiment of the invention, a contactor configured for use in a dehumidification system is provided including a plurality of contact modules. Each contact module has a porous sidewall that defines an internal space through which a hygroscopic material L flows. Adjacent contact modules are fluidly coupled to form a multipass flow path for the liquid desiccant through the contactor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
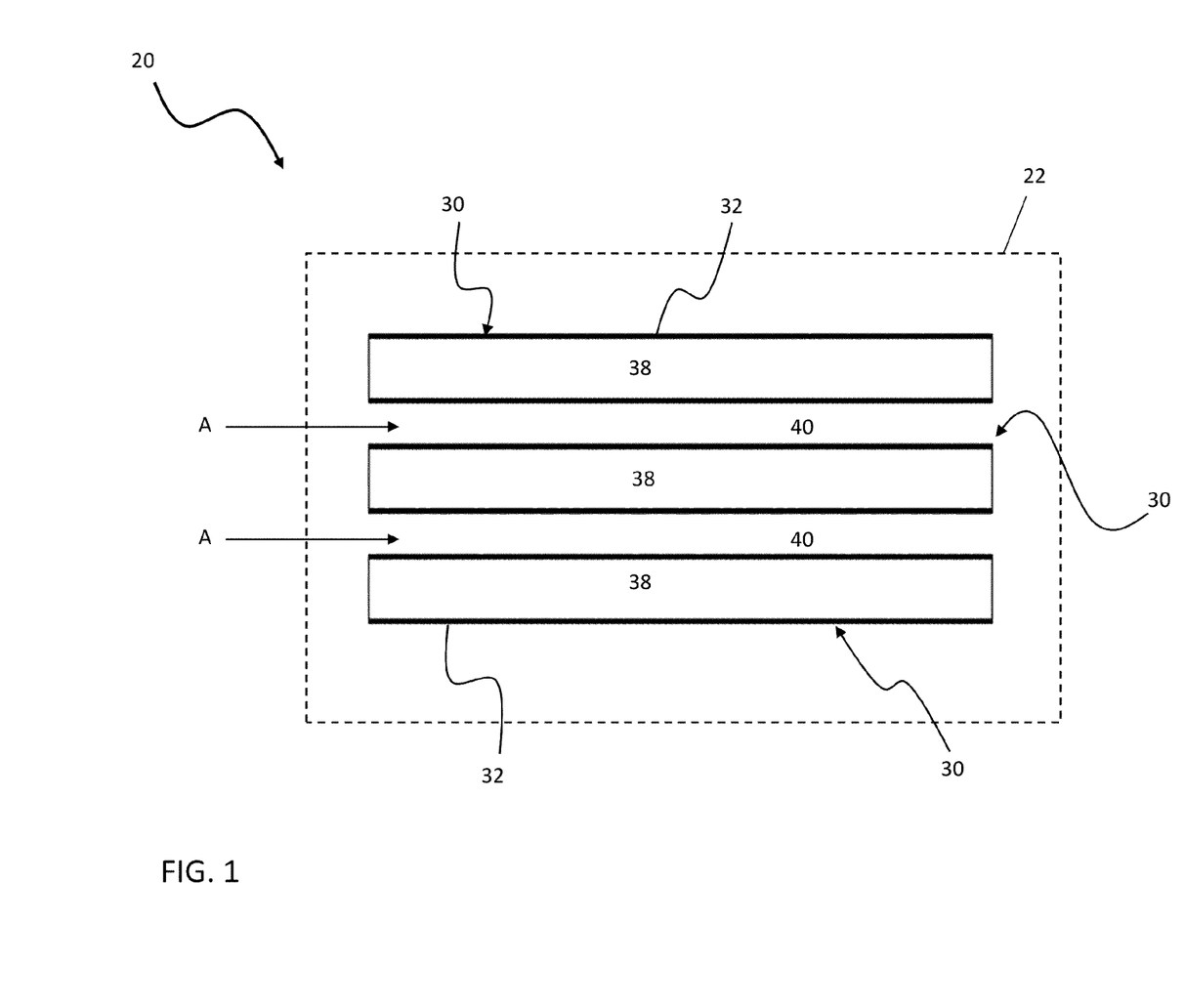
FIG. 1 is a cross-sectional view of an exemplary contactor.
Figure 2:
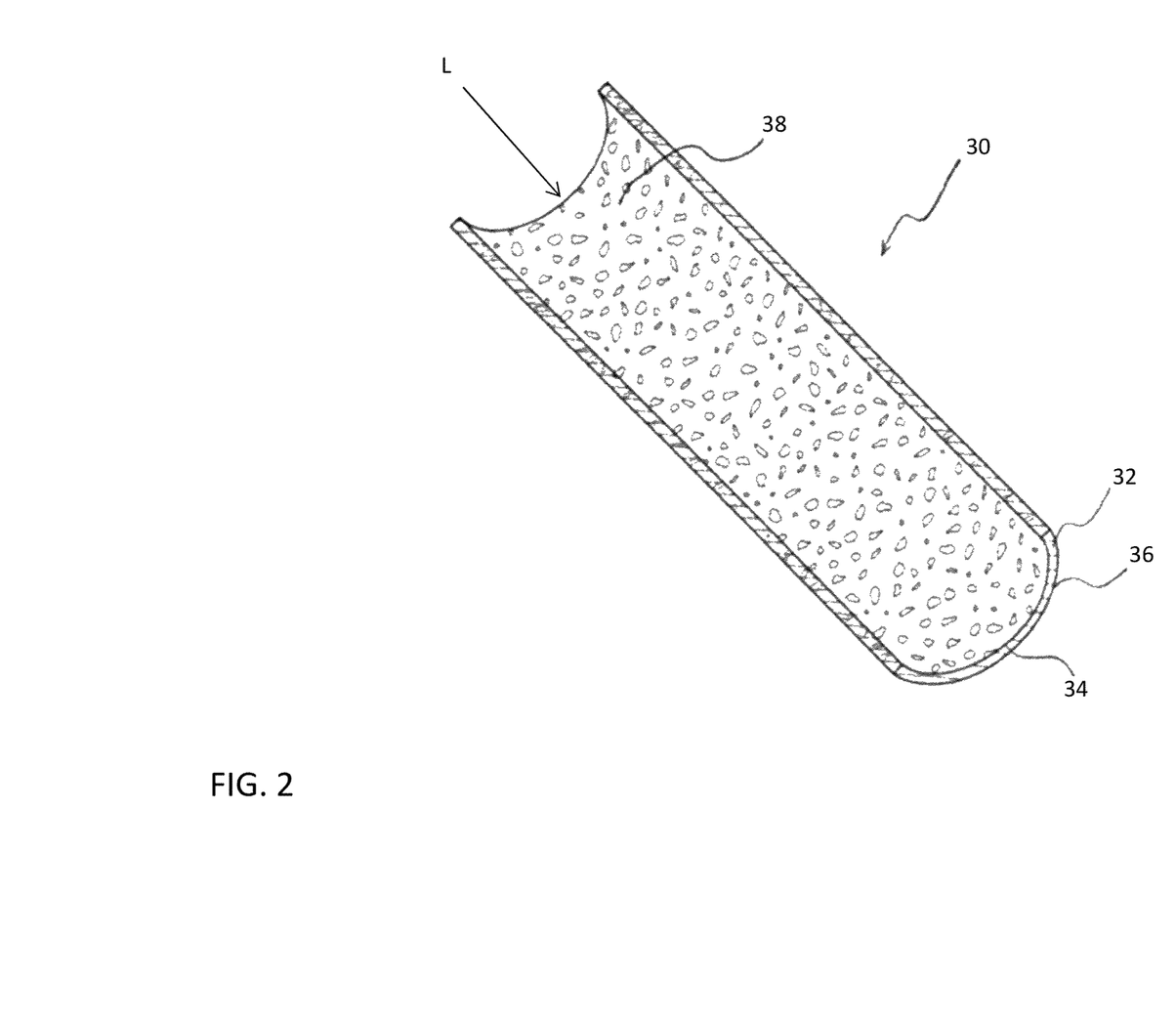
FIG. 2 is a perspective view of a cross-section of a contact module within a contactor.

Referring now to FIG. 1, a cross-section of an exemplary contactor 20, such as a flat sheet membrane contactor for example, configured for use in a dehumidification system is illustrated. The schematically illustrated contactor 20 is configured to simultaneously provide heat and/or mass transfer between a hygroscopic material L, such as an aqueous lithium chloride solution for example, and an air flow A, for example outdoor air to be cooled and conditioned prior to being supplied to a building ventilation system. A cross-section of the contactor 20 is shown in simplified form with a housing 22 represented by dashed lines and without inlet ducts, outlet ducts, manifolds, etc. . . . The contactor 20 may include a single contact module 30, or a plurality of similar contact modules 30, for example arranged in a repeating configuration as shown in FIG. 1, such that a channel 40 exists between adjacent contact modules 30. Referring now to FIG. 2, an exemplary cross-section of contact module 30, such as from a tubular contactor for example, is provided in more detail. The contact modules 30 of FIGS. 1 and 2, are formed with a porous membrane 32 having an interior side 34 and an exterior side 36 (best shown in FIG. 2). The interior side 34 of the membrane 32 defines an internal space or channel 38 through which the hygroscopic material L flows. Though a flat sheet contactor and a tubular contactor are illustrated in the FIGS., other contactors that use another known humidity absorbing/desorbing device, such as a packed tower for example, are within the scope of the invention.

The porous membrane 32 is made of a hydrophobic porous material, such as a plastic porous material for example. Examples of suitable materials for the porous membrane 32 include, but are not limited to, polypropylenes, polyethylenes, polysulfones, polyethersulfones, polyetheretherketones, polyimides, polyphenylene sulfides, polytetrafluoroethylenes, polyvinylidene difluorides, and combinations thereof. In one embodiment, the porous membrane 40 comprises thermally-resistant polymeric materials, such as polytetrafluoroethylenes, polyvinylidene difluorides, and combinations thereof. The porous membrane 32 can also be made of any porous material that can be coated with a hydrophobic coating on the surface in contact with the hygroscopic material L.

Air flow A is directed, such as with a blower for example, into the plurality of chambers or channels 40 formed between the exterior sides 36 of the membranes 32 of adjacent contact modules 30. The porous membranes 32 of the contact modules 30 are generally permeable to water molecules in a vapor state, but not to the hygroscopic material L. As a result, the porous membranes 32 allows heat and/or mass transfer between the hygroscopic material L and the air flow A adjacent the external side 36 of the porous membrane 32 to provide an air flow A of a desirable temperature and/or humidity or to regenerate the hygroscopic material L.

Figure 3:
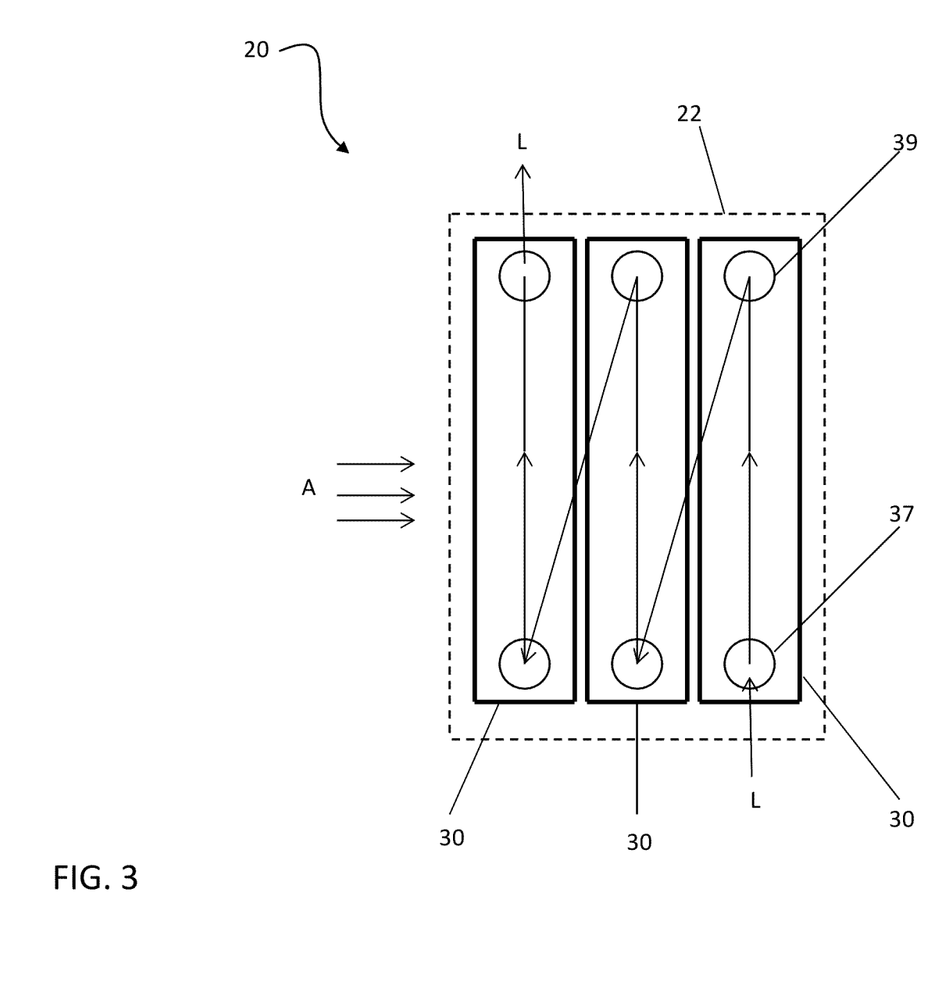
FIG. 3 is a cross-sectional view of a contactor according to an embodiment of the invention.

Referring now to FIG. 3, the plurality of contact modules 30 within the contactor 20 may be fluidly coupled to create a flow path for the hygroscopic material L including multiple passes through the contactor 20 between an inlet port 37 and an outlet port 39. The hygroscopic material L and the air flow A may be arranged in any type of flow relationship including, but not limited to, parallel-flow, cross-flow, counter-flow, or some combination thereof for example. In the illustrated non-limiting embodiment, the hygroscopic material L and the air flow A are arranged in a counter cross-flow configuration, with the air flow A making a single pass (illustrated schematically) through the contactor 20 and the hygroscopic material L making three passes through the contactor 20. Though only the hygroscopic material L, not the air flow A, is configured to make multiple passes through the illustrated contactor 20, the contactor 20 may be configured such that either one or both of the hygroscopic material L and the air flow A make any number of passes through the contactor 20 to achieve a desired level of heat and/or mass transfer between the hygroscopic material L and the air flow A.

Figure 4:
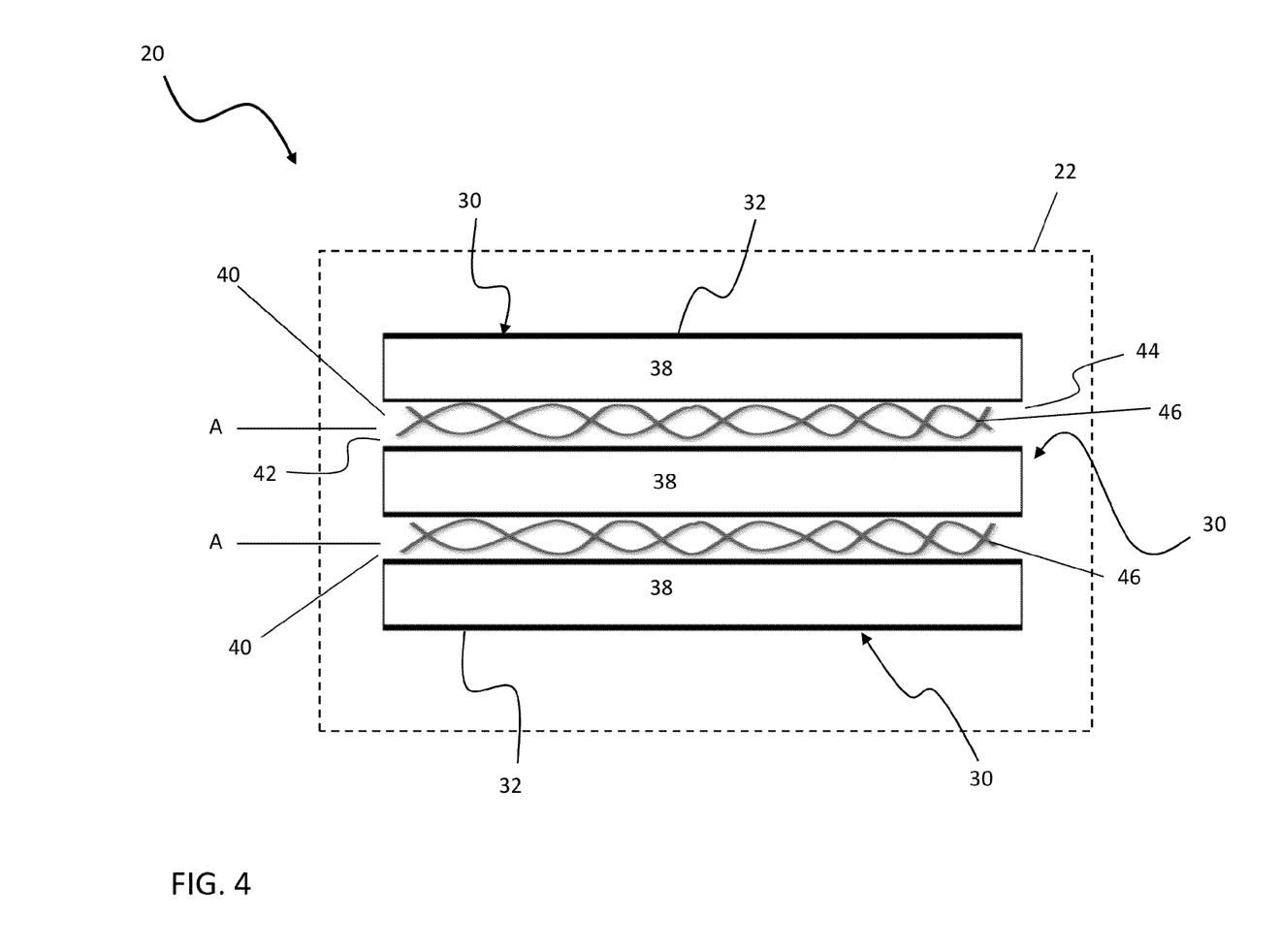
FIG. 4 is another cross-sectional view of a contactor according to an embodiment of the invention.
Figure 5:
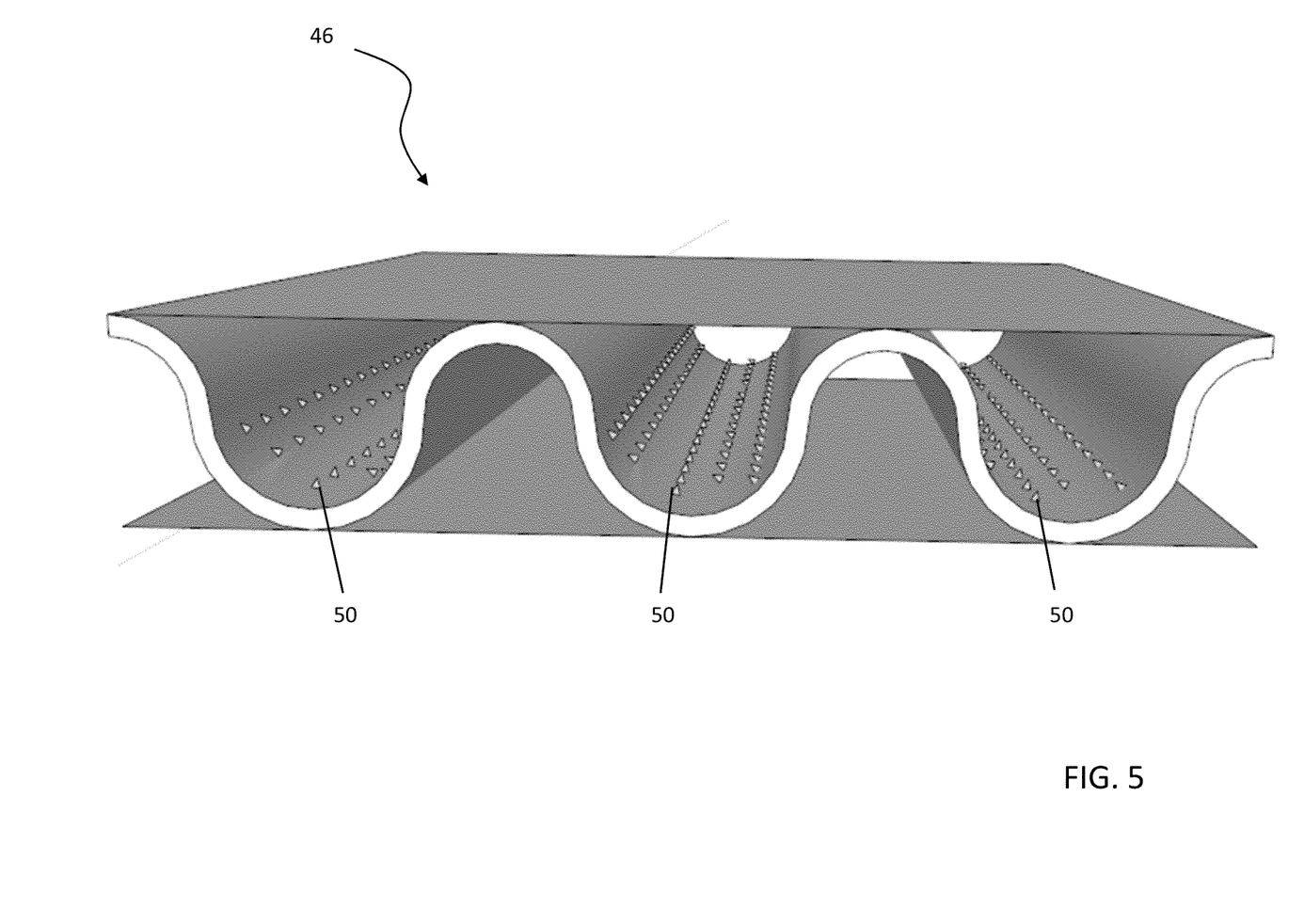
FIG. 5 is a side perspective view of a turbulator according to an embodiment of the invention.

Referring now to FIGS. 4 and 5, a turbulator 46 may be positioned in at least one of the channels 40 through which air A flows in the contactor 20, particularly in a flat sheet membrane contactor. The turbulator 46 may generally extend from an inlet end 42 to the outlet end of the air channel 40, or may extend over only a portion of a length of the channel 40. In one embodiment, the turbulator 46 may be a conventional turbulator having a generally helical shape, as shown in FIG. 4. In another embodiment, illustrated in FIG. 5, the turbulator 46 may be a generally flat, rectangular sheet 48, such as a piece of plastic or sheet metal for example, including a plurality of turbulence generating elements 50 extending out of the plane of the rectangular sheet 48. The plurality of turbulence generating elements 50 may extend from the plane of the rectangular sheet 48 in the same direction, or in opposite directions. The turbulence generating elements 50 may be any shape including, but not limited to, triangular, oval, square, and rectangular for example. The plurality of turbulence generating elements 50 may be uniform along the length of the turbulator 46, or alternatively, the turbulator 46 may include turbulence generating elements 50 having various sizes and/or shapes.

Inclusion of a turbulator 46 in an air channel 40 improves the heat and mass transfer efficiency between the air flow A and the adjacent porous membranes 32. By inserting the turbulence generating elements 50 into the air flow A, a large scale disturbance is formed adjacent an edge of each turbulence generating element 50. This disturbance effectively transports air from the center of the channel 40 to the heat transfer surface at the membranes 32 with some increase in pressure drop.

Figure 6:
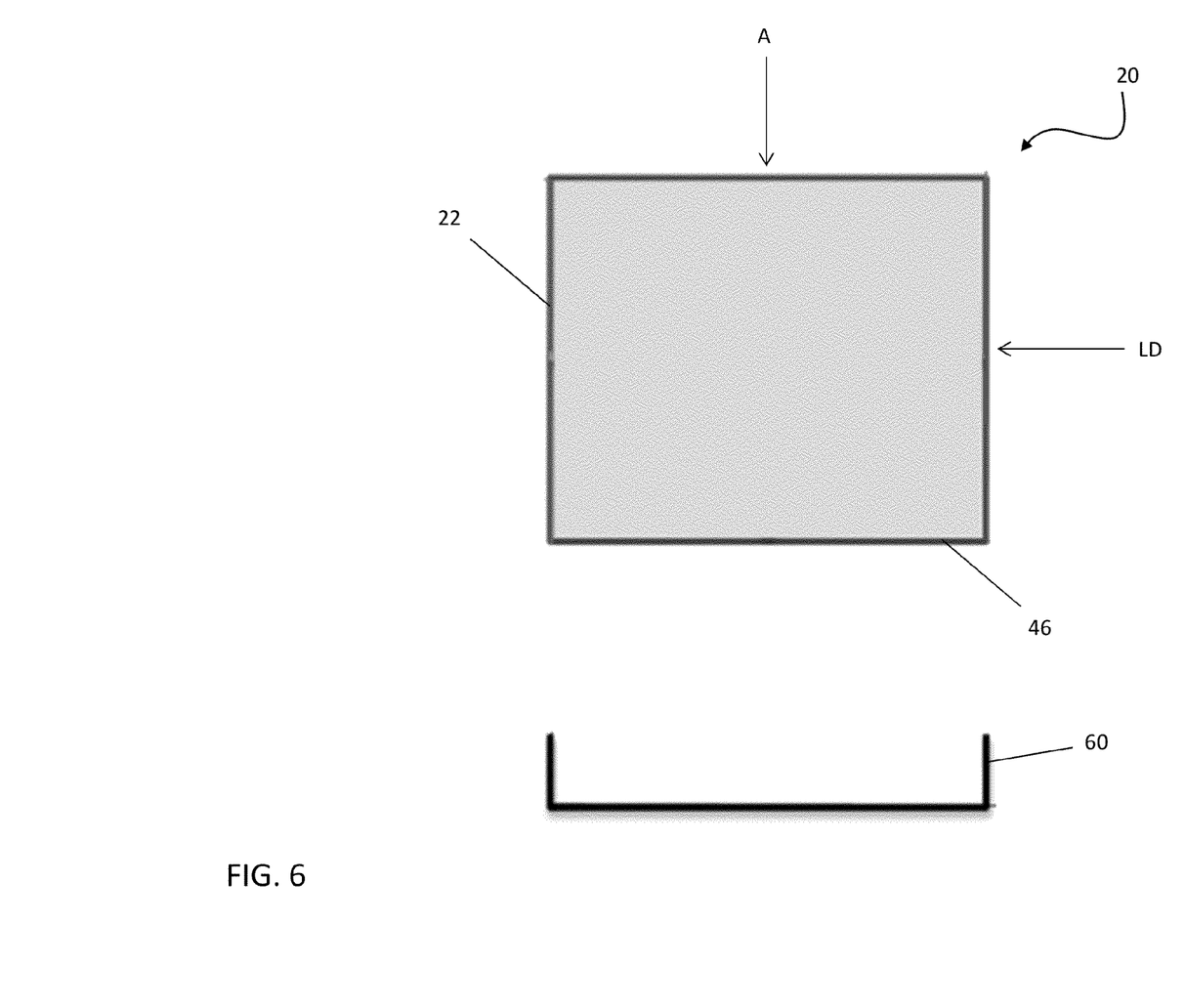
FIG. 6 is a side view of a contactor according to an embodiment of the invention.

In hot and humid climates, condensation may collect on the external side 36 of the membranes 32 of the contact modules 30 within the contactor 20, thereby hindering the heat and/and or mass transfer between the hygroscopic material L and the air flow A. Referring now to FIG. 6, the contactor 20 may be oriented such that the air flow A through the at least one air channel 40, adjacent the external side 36 of the porous membrane 32 is generally non-horizontal to prevent condensation, such as water for example, from collecting on the membrane 32. The contactor 20 may be oriented such that the direction of air flow A through the contactor 20 is at an angle between about 1 degree and about 90 degrees measured from the horizontal. In the illustrated non-limiting embodiment, the channels 40 (not shown) through which air flow A passes, and therefore air flow A, are arranged at a 90 degree angle, or generally vertically, relative to the horizontal. Together, gravity and the air flow A will cause buildup of any condensation on the membranes 32 to flow from the contactor 20. A condensate collector 60 may be positioned adjacent the outlet end 46 of the contactor 20 to collect any condensate formed. Removal of the condensate gathered within the contactor 20 prevents the formation of flow blockages and improves the operational efficiency of the contactor 20.

A contactor 20 according to the various embodiments described herein may have an improved vapor pressure distribution over a dimension of the contactor 20, allowing for a significant reduction in the membrane surface area. In addition, the mass and heat transfer of the contactor 20 is improved by mixing the air flow within the channels 40 of the contactor 20, and by limiting the collection of water vapor on a surface of the membrane 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A contactor configured for use in a dehumidification system comprising:
a plurality of similar contact modules, each contact module having a porous sidewall that defines an internal space through which a hygroscopic material flows, wherein adjacent contact modules are fluidly coupled to form a multipass flow path for the hygroscopic material.

2. The contactor according to claim 1, wherein the porous sidewall is permeable to water vapor and impermeable to the hygroscopic material.

3. The contactor according to claim 1, wherein air is configured to flow through a plurality of channels formed between an external side of the porous sidewall of adjacent contact modules.

4. The contactor according to claim 3, wherein the air is configured to flow through the contactor in a single pass.

5. The contactor according to claim 3, wherein the multipass flow path for the hygroscopic medium includes multiple passes.

6. The contactor according to claim 3, wherein the hygroscopic material and the air are arranged in a counter cross flow configuration.

7. The contactor according to claim 1, wherein a turbulator is arranged within at least one of the plurality of channels.

8. The contactor according to claim 7, wherein the turbulator extends over at least a portion of a length of one of the plurality of channels.

9. The contactor according to claim 7, wherein the turbulator is generally helical.

10. The contactor according to claim 7, wherein the turbulator includes a flat sheet having a plurality of turbulence generating elements extending outwardly from a plane of the flat sheet.

11. The contactor according to claim 10, wherein the plurality of turbulence generating elements are substantially identical.

12. The contactor according to claim 10, wherein the plurality of turbulence generating elements vary in size and/or shape.

13. The contactor according to claim 3, wherein the plurality of channels are arranged at an angle to a horizontal.

14. The contactor according to claim 13, wherein the plurality of channels are arranged at an angle between about 1 degree and about 90 degrees.

15. The contactor according to claim 14, wherein the plurality of channels are arranged at a 90 degree angle relative to the horizontal.

16. The contactor according to claim 13, wherein a condensate collector configured to collect condensation is arranged adjacent an outlet end plurality of channels.

* * * * *